(12) United States Patent
Strehler

(10) Patent No.: US 7,213,499 B2
(45) Date of Patent: May 8, 2007

(54) SPACER FOR A BOOST UNIT

(75) Inventor: Richard E Strehler, Bremen, IN (US)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 11/160,018

(22) Filed: Jun. 6, 2005

(65) Prior Publication Data

US 2006/0272493 A1    Dec. 7, 2006

(51) Int. Cl.
*F15B 21/04* (2006.01)
(52) U.S. Cl. .................................... 91/376 R
(58) Field of Classification Search ............. 91/376 R, 91/369.1; 92/161
See application file for complete search history.

(56) References Cited

U.S. PATENT DOCUMENTS

| 4,567,728 A | 2/1986 | Ohmi et al. |
| 4,953,446 A | 9/1990 | Fecher et al. |
| 5,233,911 A | 8/1993 | Rossigno |
| 5,487,324 A | 1/1996 | Gautier et al. |
| 6,073,535 A | 6/2000 | Horner et al. |
| 6,481,330 B1 | 11/2002 | Jakobi |
| 6,637,837 B2* | 10/2003 | Petin et al. .................. 74/18.2 |
| 6,679,161 B2* | 1/2004 | Vermoesen et al. ....... 91/376 R |
| D487,039 S | 2/2004 | Webster et al. |
| 6,719,477 B2 | 4/2004 | Vermoesew et al. |
| 2004/0134295 A1* | 7/2004 | Vermoesen et al. .......... 74/18.2 |

* cited by examiner

*Primary Examiner*—Thomas E. Lazo
(74) *Attorney, Agent, or Firm*—Leo H McCormick, Jr.; Sarah Taylor

(57) ABSTRACT

A spacer secured to a dash panel offsets a boost unit of a brake system into an engine compartment. The spacer has a cylindrical body with a u-shaped space through which air from the engine compartment is communicated to the boost unit to effect a brake application. The u-shaped space is divided by a plurality of walls into first and second labyrinth paths around the cylindrical body. An open cell gasket is located between the boost unit and the spacer to seal the u-shaped space. Air enters the u-shaped space and is divided into equal volumes that flow around the cylindrical body to a radial opening in the cylindrical body for distribution to the boost unit. Air flowing along the first and second labyrinth paths encounters the open cell gasket and sounds generated in the engine compartment are attenuated by being absorbed prior to delivery to the boost unit.

11 Claims, 2 Drawing Sheets

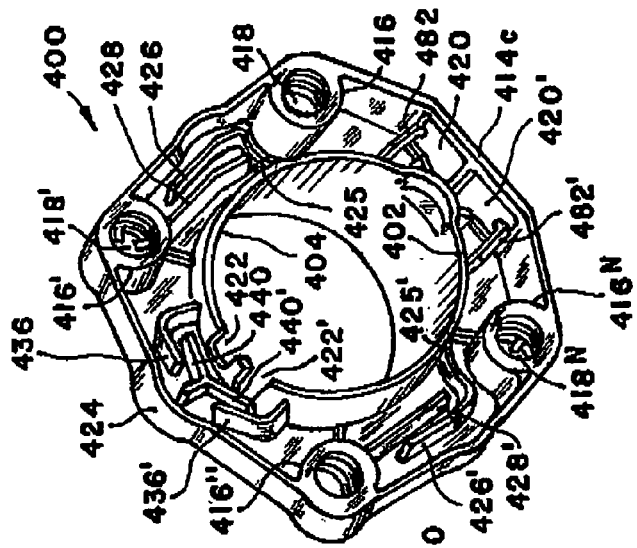
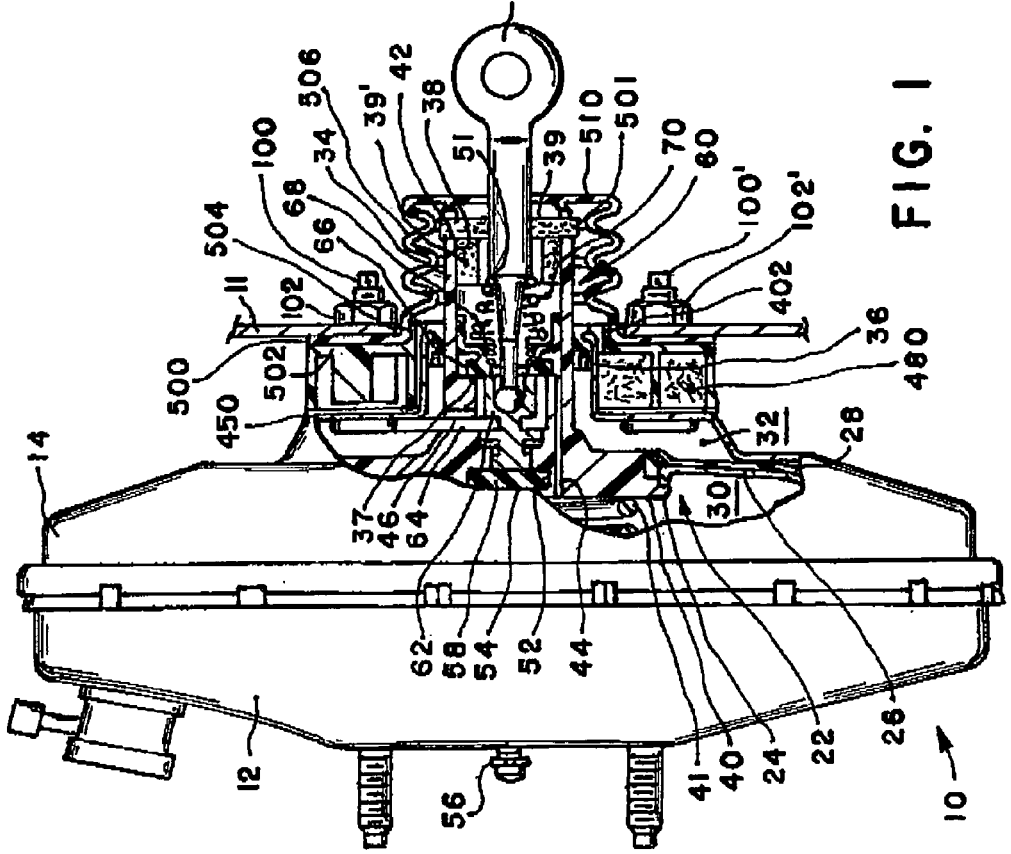

SPACER FOR A BOOST UNIT

This invention relates to a spacer for positioning a boost unit for a brake system on a panel that separates an engine compartment from a passenger compartment of a vehicle wherein the flow of air from an engine compartment occurs through a labyrinth path to the boost unit to attenuate the transmission of noise created in the engine compartment into the passenger compartment.

BACKGROUND OF THE INVENTION

In brake boosters of a type disclosed in U.S. Pat. No. 4,953,446, pressure differential is created across a wall that separates a vacuum chamber from a control chamber by air communicated from a passenger compartment. The pressure differential acts on the wall to develop an output force corresponding to an input force applied to a control valve. The control valve includes a return spring that urges a plunger toward an atmospheric seat on a poppet member and a seat spring to urge the poppet toward a vacuum seat. The input force is applied to the push rod which compresses the return spring to move the plunger and sequentially allow the seat spring to seat the poppet member on the vacuum seat and the plunger to move away from the poppet member to thereafter allow air to flow to the control chamber. The communication of air through the poppet can create noise during the development of a pressure differential.

In analyzing the operation of brake boosters it was observed that air supplied to a control valve most often is obtained from the passenger compartment of a vehicle. If the sounds caused by the flow of air from the passenger compartment during the operation of a boost unit could be shifted from the passenger compartment to an engine compartment, a passenger would not hear the booster operation. Unfortunately space in the engine compartment is limited and relocating the brake booster within the engine compartment of a vehicle still requires at least a portion of the components that are associated with a brake booster to remain in a passenger compartment of the vehicle.

U.S. Pat. No. 5,487,324 discloses structure whereby air from the engine compartment may be utilized and supplied to a control chamber of a boost unit to develop the pressure differential during a brake application and U.S. Pat. No. 6,073,535 discloses a bracket member with a resonant chamber whereby noise is created in the engine compartment is attenuated in a resonant chamber. While the structure in U.S. Pat. No. 6,073,535 functions in an adequate manner when a offset distance is sufficient to provide for the inclusion of a resonant chamber it often happens the under hood space available for the boost unit may be limited by other structural components in the engine compartment. U.S. patent application 10/708,246 discloses a spacer that positions a boost unit away from a dash panel that is mated with a boot to define and maintain a substantially uniform flow path through which air from the engine compartment is presented to a control valve in the boost unit to development of an output force in the boost unit to effect a brake application. This valve functions in an adequate manner however noise created in the engine compartment may be heard in the passenger compartment.

SUMMARY OF THE INVENTION

A primary object of the present invention is to provide a spacer to offset a boost unit into an engine compartment from a panel that separates the engine compartment from a passenger compartment wherein air flow from the engine compartment occurs along a labyrinth paths in the spacer such that noise is attenuated by the travel length and absorbed through engagement with an open cell gasket prior to being presented to the control valve and as a result the transmission of engine noise received in the passenger compartment is minimized.

According to this invention, a brake system has a boost unit that is secured to a panel of a vehicle that separates an engine compartment from a passenger compartment. The boost unit has a housing that is separated into a front chamber and a rear chamber by a movable wall connected to a valve body. The valve body has a cylindrical projection that extends through a first opening in the housing and into the passenger compartment sealed by a boot that is attached to the panel and secured to an input rod for the control valve. A valve that is located within a bore of the valve body is responsive to an input force applied to the input rod for selectively communicating air from the engine compartment to the rear chamber of the housing by way of the bore for creating a pressure differential across a movable wall in the boost unit. The resulting pressure differential acts on the movable wall to produce an output force that is supplied to a master cylinder to effect a brake application. The boost unit is off-set from the panel into the engine compartment by a spacer that is located between the panel and the boost unit. The length of the off-set may vary depending on an application of the boost unit and may be as much as two inches but more often would be about one inch. The spacer is defined by a cylindrical body with a bore that extends from a first end and to a second end, a radial wall that extends from the cylindrical body adjacent the second end, a peripheral wall that is integral with the radial wall and axially extends to a radial plane past the second end of the cylindrical body to define a u-shaped space around the cylindrical body adjacent the second end. A plurality of axial annular supports extend from the radial wall and are located in a desired pattern around the cylindrical body while the peripheral wall has a first radial opening located along a base through which air from the engine compartment is communicated into the u-shaped space. The cylindrical body has a second radial opening that is located at an apex of the top of the peripheral wall with respect to the base and extends from the second end toward the radial wall. A gasket made of an open cell material is located between the peripheral wall and second end of the cylindrical body and the booster to seal the u-shaped space such that any air that flows through the first radial opening in the peripheral wall into the sealed u-shaped space is divided into substantially equal volumes of air that flows along first and second paths around the cylindrical body. The volumes of air are united prior to flowing through the second radial opening and into the second bore in cylindrical body for distribution to the first bore in the valve body during a brake application. The air that flows along first and second paths extends the length of travel of air from the first radial opening in the spacer to the first bore the valve body to attenuate noise and the engagement with the open cell material of the gasket also absorbs some noise that is generated in the engine compartment such the noise is essentially reduces prior to the air being presented to the control valve located in the passenger compartment.

An advantage of a brake system using this invention resides in a communication of air from an engine compartment to a valve in a boost unit through labyrinth paths in a spacer to attenuate the communication of noise into a passenger compartment.

A further advantage of this brake system of this invention resides in a spacer wherein air flow from the engine compartment is initially divided into first and second flow paths in order to bring the air into tangential engagement with an open cell gasket where some sound is absorbed and thereafter combined prior to being presented to a control valve in a boost unit.

BRIEF DESCRIPTION OF THE DRAWINGS

FIG. 1 is a boost unit for a brake system that is offset from a dash panel by a spacer made according to the principals of the present invention;

FIG. 2 is a perspective view of the spacer of FIG. 1;

DETAILED DESCRIPTION

In the specification where similar components are used the component may be identified by a number plus ' or the same number depending on a need to understand the relationship with other components.

Figure 3:
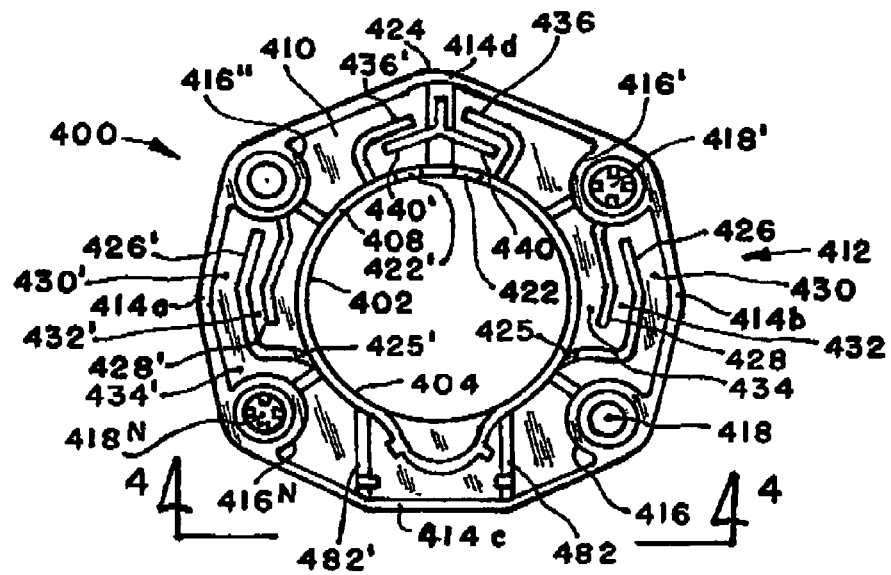
FIG. 3 is a rear end view of the spacer of FIG. 2.
Figure 4:
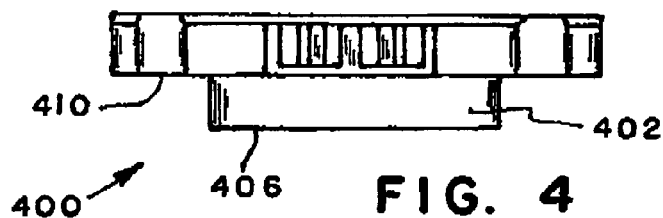
FIG. 4 is a view taken along lines 4—4 of FIG. 3.
Figure 5:
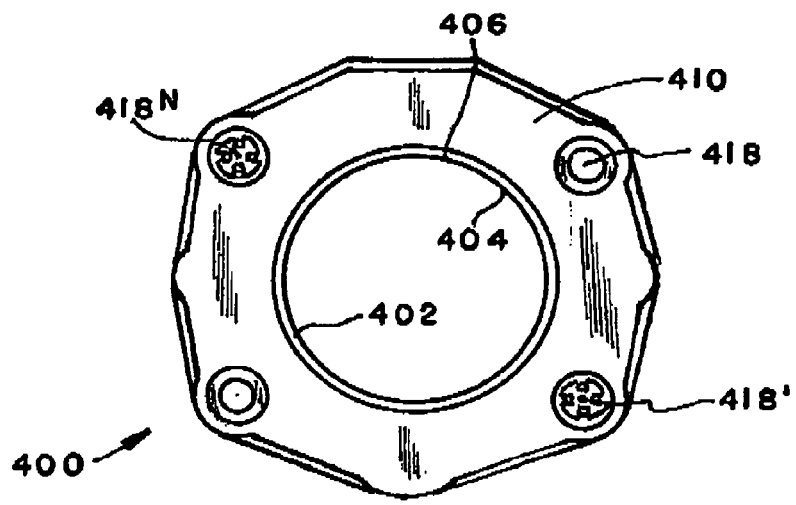
FIG. 5 is a front end view of the spacer of FIG. 2.

FIG. 1 provides an illustration of a spacer 400 of the present invention illustrated in FIGS. 2, 3, 4 and 5 for locating a boost unit 10 an offset distance from a dash panel 11 and into an engine compartment of a vehicle. The boost unit 10 provides a power assist in supplying a master cylinder with an input force to effect a brake application. The boost unit 10 is of a type that functions in a manner as disclosed in U.S. Pat. No. 4,953,446.

In more particular detail, the boost unit 10 includes a front shell 12 that is joined to a rear shell 14 to form a unitary structure. A wall 22 that includes a backing plate 26 is carried on a center hub 24 and held against a shoulder by a diaphragm 28 to divide the interior of the unitary structure into a front chamber 30 and a rear chamber 32. A cylindrical projection or valve body 34 extends from the center hub 24 through a sealed opening 36 in the rear shell 14. The valve body 34 has an axial bore 38 that extends from a front face 40 on the central hub 24 to the end 42 of the cylindrical projection 34. The front of the center hub 24 has a face with an annular groove 52 that surrounds a bearing surface that extends inward into the axial bore 38. The central hub 24 has a first passageway 44 that extends from the front face to an annular vacuum seat 37 in the axial bore 38 and a second passageway 46 that extends from the axial bore 38 through the cylindrical projection 34. A head 54 on output push rod 56 surrounds a reaction disc 58 that is retained in annular groove 52 of the center hub 24. Head 54 communicates an output force that is developed through movement of the wall 22 by a pressure differential created between chambers 30 and 32, to the output rod 56 that is connected to pistons in the master cylinder. The development of the output force is under the control of a control valve 60 that is located in bore 38 that responds to an input force applied to push rod 50.

The control valve 60 under the control of an input applied to push rod 50 includes a plunger 62 that is retained in bore 38 by key member 64 and a poppet member 66 that is retained in bore 38 by a retainer member 68. A valve return spring 70 that is caged between the retainer member 68 and a shoulder 51 on push rod 50 urges the plunger 62 toward the poppet member 66 while a poppet spring 71 urges the face on the front of poppet member 66 toward an annular atmospheric seat on the plunger 62.

A plurality of bolts 100,100' (only two are illustrated but most often four are used) extend from the rear shell 14 of the unitary structure. The bolts 100,100' are used to attach the boost unit 10 to a dash panel 11 of the vehicle. The bolts 100,100' are located in a pattern that match the axial bores 418, 418' . . . 418" for bearings surfaces 416, 416' . . . 416" in spacer 400 as best illustrated in FIGS. 2, 3, 4 and 5. The dash panel 11 divides or separates an engine compartment of the vehicle from the passenger compartment and through the spacer 400 of the present invention, the boost unit 10 is off set into the engine compartment. The off set allows the boost unit 10 to be positioned within the engine compartment and avoid interference with some other components that are located within the engine compartment. In addition noise created in the engine compartment and noise generated through the communication of air to development a pressure differential is essentially dampened to a level so as not to be heard in a passenger compartment during a brake application.

The spacer 400 is further illustrated in FIGS. 2, 3, 4 and 5, and includes a cylindrical body 402 with a bore 404 that extends from a first end 406 and to a second end 408. A radial wall 410 extends from the cylindrical body 402 at a distance from the second end 408 to essentially define the length of the offset of the boost unit 10 into the engine compartment. A unitary peripheral wall 412 that extends from the radial wall 410 is defined by complementary first 414a and second 414b side walls that are joined together through a base wall 414c and a top wall 414d. The peripheral wall 412 axially extends to a radial plane past the second end 408 of the cylindrical body 402 to define a u-shaped space around the cylindrical body 402 adjacent the second end 408. A plurality of axial annular supports or bearings surfaces 416, 416' . . . 416" that extend from the radial wall 410 are located in a desired pattern around the cylindrical body 402 and as shown at the intersection of the first 414a and second 414b side walls with the base wall 414c and the top wall 414d. The peripheral wall 412 has a first radial opening 420,420' that is located in the base wall 414d through which air from the engine compartment is communicated into the u-shaped space while the cylindrical body 402 has a second radial opening 422,422' that is located at an apex 424 with respect to the base 414d that extends from the second end 408 toward the radial wall 410 to define identical first and second portions and corresponding first and second flow paths in the u-shaped space between the first radial opening 420,420' and the second radial opening 422,422'.

The interior of the u-shaped space is further divided by first 426 and second 426' intermediate walls that respectively extend from cylindrical body 402 and radial wall 410 and third 428 and fourth 428' intermediate walls that respectively extend from axial supports or bearings 416' and second 416" and the radial wall 410 to divide each of first and second portions into substantially equal first 430,430', second 432, 432' and third 434,434' channels located between the axial annular supports or bearings surfaces 416, 416' . . . 416" to further increase the length of the flow path for air along the first and second flow paths between the first radial opening 420,420' and said second radial opening 422,422'.

The interior of the u-shaped space is further divided by a fifth 436,436' intermediate wall that extend from the cylindrical body 402 and radial wall 410 adjacent the second radial opening 422,422' to adjacent a sixth intermediate wall 438,438' that extends from a divider 440 that extends from the radial wall 410 and is located near the apex 424 of the top wall 414d wherein the first and second flow paths are united into a unitary flow path prior to entry into the second radial opening 422,422'.

A gasket 450 made of an open cell material is aligned on the rear shell by the mounting bolts 100,100' and spacer 400 placed on the mounting bolts 100,100' such that the end of the peripheral wall 412 and the second end 408 of the cylindrical body 402 engage the gasket 450.

A base member 502 of a boot 500 is placed on the mounting bolts 100,100' and engages radial wall 410 such that the first end of cylindrical body 402 forms a support for the end 504 of an accordion shaped body 506. The accordion shaped body 506 has a plurality of hold off ribs 501, 501' . . . 501" around its interior to prevent the accordion shaped body 506 from being collapsed into the cylindrical projection 34 that extends hub 24 of the boost unit 10. The end of the accordion shaped body 506 is fixed to push rod 50.

When nuts 102,102' are fixed to corresponding mounting bolts 100,100', the spacer 400 is sealed between the panel 11 and rear shell 14 through the base member 502 of boot 500 and gasket 450 such that the u-shaped space is sealed. The flow path for air between the first radial opening 420,420' and the second radial opening 422,422' as defined by identical labyrinth paths is such that air from the engine compartment is initially divided into substantially equal volumes and later combined for entry into the bore 404 of the cylindrical body 402 and presentation to the axial bore 38 of the cylindrical projection 34 to effect a brake application in accordance with an input applied to control valve 60.

The first 426 and second 426' intermediate walls of spacer 400 is further defined by identical notches 425,425' located adjacent the cylindrical body 402 to provide an opening whereby any moisture or condensation that may accumulate in the u-shaped space may be communicated to the surrounding environment through the first radial opening 420, 420' in the base of the peripheral wall 412.

Further a filter 480 is retained in the u-shaped space by tabs 482,482' in a location adjacent the first radial opening 420,420' to prevent the insects and large particles of material into the u-shaped space.

MODE OF OPERATION OF THE INVENTION

The boost unit 10 is located in the engine compartment of a vehicle and chamber 30 within boost unit 10 is connected to the intake manifold of an internal combustion engine through a check valve. When the engine is operating, vacuum is produced at the intake manifold which evacuates air from chambers 30 and 32 such that a return spring 41 located within the boost unit 10 positions wall 22 in a rest position as shown in FIG. 1. When an operator desires to effect a brake application, an input force is applied to pedal which linearly moves push rod 50 causing plunger 42 to move away from an atmospheric seat on poppet member 66 and allow air to flow from the engine compartment into chamber 32 by way of the first radial opening 420,420', labyrinth paths in the spacer 400, the second radial opening 422,422', axial bore 404 in the cylindrical body 402, through the accordion shaped body 506 of boot 500, around the end of boot 500, through hold off projections on the end 510 of boot 500, through filters 39,39', into bore 38 and out passageway 46 to the rear chamber 32. With air in the rear chamber 32 and vacuum in chamber 30, a pressure differential, corresponding to the input force applied to input member 50 is created across wall 22 to develop an output force which after overcoming the force of return spring 41 is communicated into the output push rod 56 for moving pistons in the master cylinder to effect a brake application.

During a brake application, flow of air from the engine compartment occurs along the labyrinth paths in the spacer 400 after being divided into substantially equal volumes on entry into the u-shaped space and reunited at the apex 424 of the spacer prior to flowing through the second radial opening 422,422' to bore 402 for distribution to the control valve 60. As the air flows along the length of labyrinth paths it encounters the open cell foam in gasket 450 such that some of the noise created in the engine compartment and some noise created by the flow of air from the first radial opening 420,420' toward the second radial opening is absorbed and as a result essentially none of these sounds are heard in the passenger compartment of the vehicle. The first 426 and second 426' intermediate walls, third 428 and fourth 428' intermediate walls and fifth 436 intermediate wall and sixth 438' intermediate wall and divider 440 increase the length of travel of air from the first radial opening 420,420' to the second radial opening 422,422' such that air has a greater opportunity to encounter the open cells in the gasket 450 and thus a the gasket has a greater opportunity to absorb more noise than would occur would occur should air flow be direct from the engine compartment to the bore 38 associated with the control valve 60.

What is claimed is:

1. A brake system with a boost unit that is secured to a panel of a vehicle that separates an engine compartment from a passenger compartment, said boost unit having a housing that retains a valve body with a cylindrical projection that extends through a first opening in the housing and into the passenger compartment, a boot that is located on the panel with an end that extends through the first opening in the housing and is secured to an input rod, a valve that is located within a first bore of the valve body and is responsive to an input force that is applied to the input rod to selectively communicate air from the engine compartment to a chamber in the boost unit by way of the first bore for creating a pressure differential across a movable wall in the boost unit, the pressure differential acting on the movable wall to develop an output force to effect a brake application, and a spacer that is located between the panel and the boost unit for off-setting the boost unit from the panel into the engine compartment; said spacer being characterized by a cylindrical body with second bore that extends from a first end and to a second end, a radial wall that extends from the cylindrical body adjacent said second end, a peripheral wall integral with said radial wall that axially extends to a radial plane past said second end of the cylindrical body to define a u-shaped space around said cylindrical body adjacent said second end, a plurality of axial annular supports that extend from said radial wall that are located in a desired pattern around said cylindrical body, said peripheral wall having a first radial opening located along a base through which air from the engine compartment is communicated into said u-shaped space, said cylindrical body having a second radial opening located at an apex of said base that extends from said second end toward said radial wall and a gasket located between said peripheral wall and second end of said cylindrical body and the booster to seal said u-shaped space such that air flows through said first radial opening in said peripheral wall and into the sealed u-shaped space and is divided into substantially equal volumes of air that flows along first and second paths around said cylindrical body, through said second radial opening and into said second bore in cylindrical body for distribution to the first bore in the valve body during a brake application, said first and second paths extending the length of travel of air from said first radial opening to said first bore and as a result some noise that is generated in the engine compartment is absorbed by said gasket prior to passing through said second radial opening.

2. The brake system as recited in claim 1 wherein said spacer further includes a first and second intermediate walls that respectively extend from said cylindrical body and said radial wall and third and fourth intermediate walls that respectively extend from first and second axial supports of said plurality of supports and said radial wall to divide first and second portions of said u-shaped space into substantially equal first, second and third spaces to further increase the length of travel for air along the first and second flow paths between said first radial opening and said second radial opening.

3. The brake system as recited in claim 2 wherein said spacer further includes fifth and sixth intermediate walls that respectively extend from said cylindrical body and said radial wall adjacent said second radial opening to adjacent a divider that extends from said radial wall such that the equal volumes of air that flows around said cylindrical body are joined together prior to flowing through said second radial opening into said second bore of said cylindrical body.

4. The brake system as recited in claim 3 wherein said first and second intermediate walls further respectively include a slot located adjacent the cylindrical body to provide direct flows path between said fifth and sixth intermediate walls such that any condensation that may accumulate in said sealed u-shaped space is communicated to said first radial opening in said peripheral wall.

5. The brake system as recited in claim 4 wherein said gasket is characterized as being an open cell foam material that forms a surface for absorbing sound.

6. A brake system with a boost unit that is secured to a panel of a vehicle that separates an engine compartment from a passenger compartment, the boost unit having a housing that retains a valve body with a cylindrical projection that extends through a first opening in the housing into the passenger compartment, a boot located on the panel with an end that extends through the first opening and is secured to an input rod, a valve located within a first bore of the valve body that is responsive to an input force that is applied to the input rod to selectively communicate air from the engine compartment to a chamber in the boost unit by way of the first bore for creating a pressure differential across a movable wall in the boost unit, the pressure differential acting on the movable wall to develop an output force to effect a brake application, a spacer located between the panel and the boost unit for off-setting the boost unit from the panel into the engine compartment; said spacer being characterized by a cylindrical body with a second bore that extends from a first end and to a second end, a radial wall that extends from said cylindrical body with complementary and unitary first and second side walls that extend from an apex to a base to define a u-shaped space adjacent said second end, said first and second side walls each having a radial face that extends past said second end of said cylindrical body, said base of said first and second side walls having a first radial opening for connecting said u-shaped space with the engine compartment, said cylindrical body having a second radial opening for connecting said u-shaped space with said second bore, said first and second side wall having a plurality of annular axial supports with each support having an opening through which a fastener extends from the panel to orientate said apex above said base in the engine compartment and on engagement of a face on said first and second side walls with the boost unit said u-shaped space is sealed such that when air flows from the engine compartment to the first bore a flow path is defined by said first radial opening in said peripheral wall, said u-shaped space, said second radial opening and said second bore.

7. The brake system as recited in claim 6 wherein said flow path is further characterized by air being divided into substantially equal volumes on entry into said u-shaped space for flow along first and second flow paths around said cylindrical body and is reunited into a unitary volume prior to passing through said second radial opening, said air on traveling along said first and second flow paths encounters a gasket member located between said radial face of said first and second side walls and said boost unit such that some of the sounds generated in the engine compartment are absorbed prior to air entering said second bore for distribution to said first bore to effect a brake application.

8. The brake system as recited in claim 7 wherein said gasket member is an open cell foam material.

9. The brake system as recited in claim 8 where in said u-shaped space is further characterized by a plurality of axial walls that respectively form first and second labyrinth paths in said first and second flow paths to increase the length of travel of air between said first radial opening and second radial opening and the opportunity for air to contact said open cell foam material to further reduce the transmission of sound generated in the engine compartment prior to the air passing through the second radial opening.

10. The brake system as recited in claim 9 wherein said spacer is further characterized in that a peripheral surface adjacent said first end of said cylindrical body forms an annular support for a flange on the boot to prevent the boot from being positioned against the first end in a manner that would affect the communication of air to the first bore.

11. The brake system as recited in claim 10 wherein said spacer is further characterized by a filter located between said cylindrical body and said first and second side wall adjacent said first radial opening to prevent particles from entering into said u-shape space with the flow of air from the engine compartment.

\* \* \* \* \*